US008953448B2

United States Patent
Pharn

(10) Patent No.: US 8,953,448 B2
(45) Date of Patent: *Feb. 10, 2015

(54) LINKED-LIST HYBRID PEER-TO-PEER SYSTEM AND METHOD FOR OPTIMIZING THROUGHPUT SPEED AND PREVENTING DATA STARVATION

(75) Inventor: Art Pharn, Huntington Beach, CA (US)

(73) Assignee: Abroadcasting Company, Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,058

(22) Filed: Apr. 13, 2012

(65) Prior Publication Data

US 2012/0203922 A1  Aug. 9, 2012

Related U.S. Application Data

(63) Continuation of application No. 11/800,180, filed on May 3, 2007, now Pat. No. 8,159,949.

(51) Int. Cl.
*G01R 31/08* (2006.01)
*H04L 29/08* (2006.01)
*H04L 29/06* (2006.01)

(52) U.S. Cl.
CPC .......... *H04L 67/104* (2013.01); *H04L 67/1002* (2013.01); *H04L 67/1046* (2013.01); *H04L 69/24* (2013.01); *H04L 65/4076* (2013.01); *H04L 67/1008* (2013.01); *H04L 67/1044* (2013.01)
USPC .......................................... 370/234; 370/255

(58) Field of Classification Search
None
See application file for complete search history.

(56) References Cited

U.S. PATENT DOCUMENTS

| | | | |
|---|---|---|---|
| 5,513,182 A * | 4/1996 | Kawamura et al. | 370/254 |
| 5,596,723 A | 1/1997 | Romohr | |
| 5,864,542 A * | 1/1999 | Gupta et al. | 370/257 |
| 5,939,997 A * | 8/1999 | Sekine et al. | 340/3.43 |
| 6,212,171 B1 * | 4/2001 | LaFollette et al. | 370/257 |
| 6,404,770 B1 * | 6/2002 | Fujimori et al. | 370/429 |
| 6,522,654 B1 * | 2/2003 | Small | 370/400 |
| 7,158,483 B1 * | 1/2007 | Takabatake et al. | 370/254 |
| 7,289,456 B2 * | 10/2007 | Gupta et al. | 370/254 |
| 7,366,115 B2 * | 4/2008 | Vandensande | 370/257 |
| 7,394,817 B2 | 7/2008 | Yap | |
| 7,475,128 B2 | 1/2009 | Katayama | |
| 7,698,386 B2 | 4/2010 | Amidon et al. | |
| 7,720,083 B2 | 5/2010 | Alexandrou et al. | |
| 7,720,908 B1 * | 5/2010 | Newson et al. | 709/204 |
| 2002/0103945 A1 * | 8/2002 | Owen et al. | 710/10 |
| 2002/0161898 A1 * | 10/2002 | Hartop et al. | 709/227 |
| 2003/0051051 A1 * | 3/2003 | O'Neal et al. | 709/242 |
| 2003/0105812 A1 | 6/2003 | Flowers et al. | |
| 2003/0123473 A1 * | 7/2003 | Satoh et al. | 370/442 |
| 2004/0017813 A1 * | 1/2004 | Gulati et al. | 370/395.4 |
| 2004/0136381 A1 | 7/2004 | Kinstler | |
| 2005/0030902 A1 | 2/2005 | Choi et al. | |

(Continued)

*Primary Examiner* — Marsha D Banks Harold
*Assistant Examiner* — Hooman Houshmand
(74) *Attorney, Agent, or Firm* — Knobbe, Martens, Olson & Bear, LLP

(57) ABSTRACT

A system and method is described for formulating a linked-list hybrid peer-to-peer sub-network that analyzes capabilities of plurality of nodes, and creating at least two linked-list hybrid peer-to-peer sub-networks by forming a first group of nodes of the plurality of nodes having similar capabilities and establishing serial connections between nodes of the first group of nodes to form a first linked-list hybrid peer-to-peer sub-network.

8 Claims, 14 Drawing Sheets

(56) References Cited

U.S. PATENT DOCUMENTS

| | | |
|---|---|---|
| 2005/0044147 A1 | 2/2005 | Yap |
| 2005/0086329 A1* | 4/2005 | Datta et al. .................... 709/220 |
| 2005/0111383 A1* | 5/2005 | Grob et al. .................... 370/254 |
| 2005/0117601 A1* | 6/2005 | Anderson et al. ............. 370/465 |
| 2006/0245454 A1* | 11/2006 | Balasubramanian et al. 370/509 |
| 2007/0094405 A1 | 4/2007 | Zhang |
| 2007/0097885 A1 | 5/2007 | Traversat et al. |
| 2007/0130253 A1* | 6/2007 | Newson et al. ................ 709/203 |
| 2007/0174246 A1 | 7/2007 | Sigurdsson et al. |
| 2008/0034099 A1* | 2/2008 | Kageyama .................... 709/228 |
| 2008/0316929 A1 | 12/2008 | Busser et al. |
| 2009/0003198 A1* | 1/2009 | Hashiguchi et al. .......... 370/222 |
| 2009/0154375 A1 | 6/2009 | Coskun et al. |
| 2009/0276803 A1 | 11/2009 | Weaver |
| 2009/0300673 A1 | 12/2009 | Bachet et al. |
| 2010/0177773 A1 | 7/2010 | Kolhi et al. |
| 2010/0225826 A1 | 9/2010 | Maandonks et al. |

\* cited by examiner

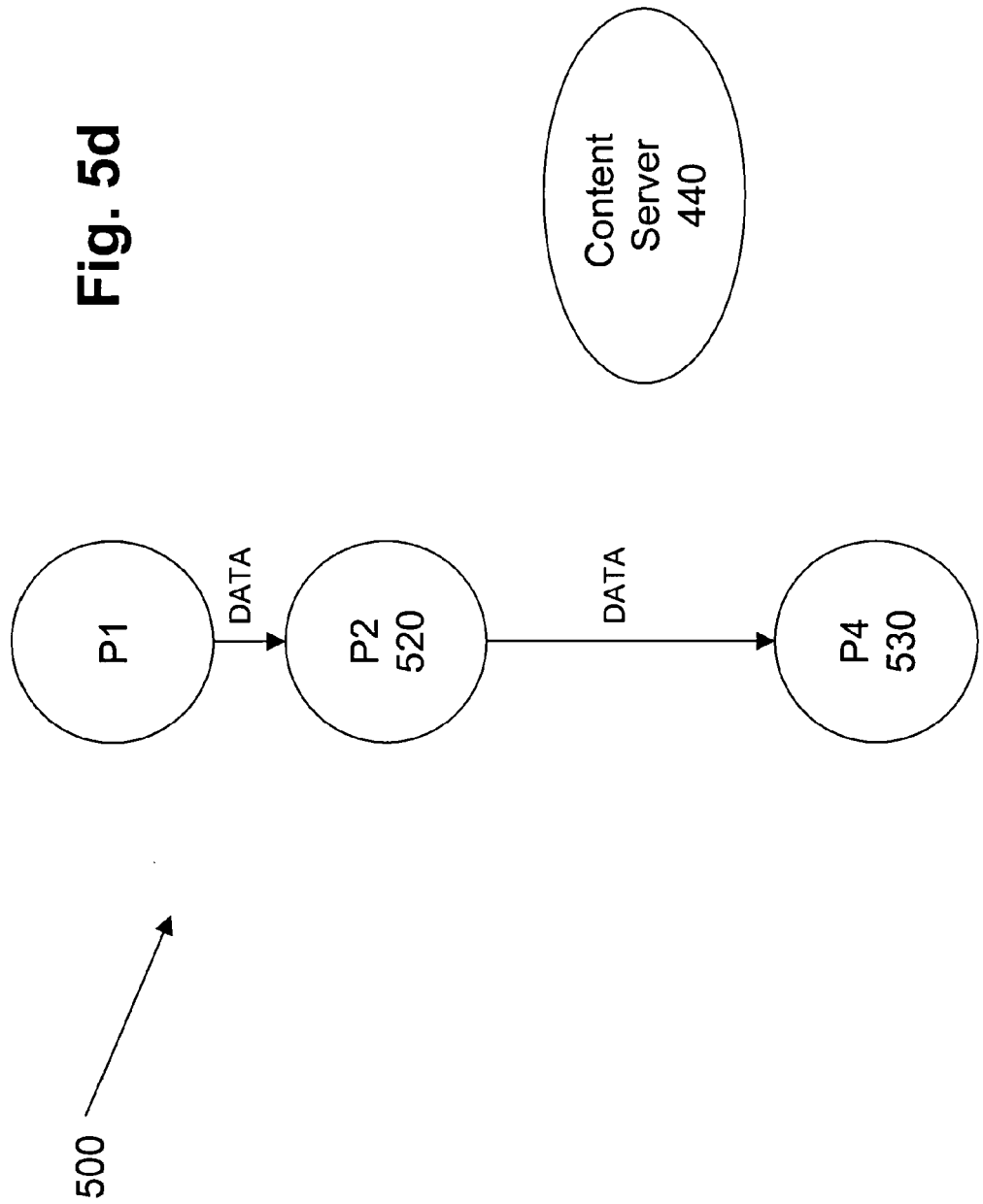

LINKED-LIST HYBRID PEER-TO-PEER SYSTEM AND METHOD FOR OPTIMIZING THROUGHPUT SPEED AND PREVENTING DATA STARVATION

CROSS-REFERENCE TO RELATED APPLICATIONS

This application is a continuation of U.S. patent application Ser. No. 11/800,180 filed on May 3, 2007, titled "LINKED-LIST HYBRID PEER-TO-PEER SYSTEM AND METHOD FOR OPTIMIZING THROUGHPUT SPEED AND PREVENTING DATA STARVATION", the entire contents of which are incorporated herein by reference.

BACKGROUND OF THE INVENTION

1. Field of the Invention

Embodiments of the present invention generally relate to the field of Video Over Internet Protocol, and more particularly to Internet Protocol television (IPTV).

2. Description of the Related Art

Video over Internet Protocol (IP) is a network-based one-way transmission of video content. A video source transmits video as a unicast or multicast transmission. For a unicast transmission, the broadcasting source replicates the video for each targeted client (or viewer). For a multicast transmission, however, the broadcasting source sends the same signal over the network as a single video transmission, but the video is sent to a selected group of clients.

Over the last few years, there has been interest in live video broadcasting over IP, which is different from other types of communications on the Internet. For example, one primary difference is that live video broadcasting (or streaming) is a one-way communication scheme instead of a two-way communication scheme.

Normally, client-server network architectures are used for video transmissions such as Internet Protocol television (IPTV) while peer-to-peer (P2P) network architectures are typically used for file-sharing environments where reduced transmission costs are more important than download speed. P2P networks efficiently distribute transmission costs among the nodes by eliminating dedicated server functionality.

As shown in FIG. 1, a conventional P2P network 100 includes a plurality of nodes $110_1$-$110_N$ (N≥2), where each node operates as both a "client" and a "server" to the other clients on the network. More specifically, P2P network 100 features multiple nodes (electronic devices) interconnected to each other over communication paths 120. These nodes operate as either super nodes or leave nodes. A "super node" is generally defined as an electronic device with large resources of CPU power and network bandwidth such as client $110_1$. These types of nodes shield "leave nodes," which are electronic devices having very limited resources such as client $110_2$.

P2P network architectures possess a number of drawbacks. For instance, for conventional P2P networks, data starvation occurs when the ratio of super nodes to leave nodes fall below a minimum level. In a file-sharing environment, large variations in downloading time are commonplace. However, such variations are not suitable when supporting live TV broadcasting where data needs to arrive at its destination within a specific time period or the user will experience a disruption in video playback.

Another drawback of conventional P2P networks involves the unpredictable delay experienced when a node joins or leaves the P2P network. A node usually joins a P2P network by connecting to a small group (one or two) of other nodes at a time. During this joining period, if this small group of other nodes leave the network, the node will have to restart the joining process again from the beginning. If a very large number of clients are leaving the network one after the other, a new client joining the network may experience a long delay. This situation can be common in live TV broadcasting, especially at the end of a popular show. Setting high priority to joining nodes over existing nodes does not completely solve the problem because it creates yet another problem by slowing down the exiting nodes from switching to a new channel.

BRIEF DESCRIPTION OF THE DRAWINGS

The invention may best be understood by referring to the following description and accompanying drawings that are used to illustrate embodiments of the invention.

FIGS. 5A-5D are exemplary embodiments of operations performed for a node (P3) leaving the linked-listed hybrid P2P network of FIG. 2A.

DETAILED DESCRIPTION

Figure 1:
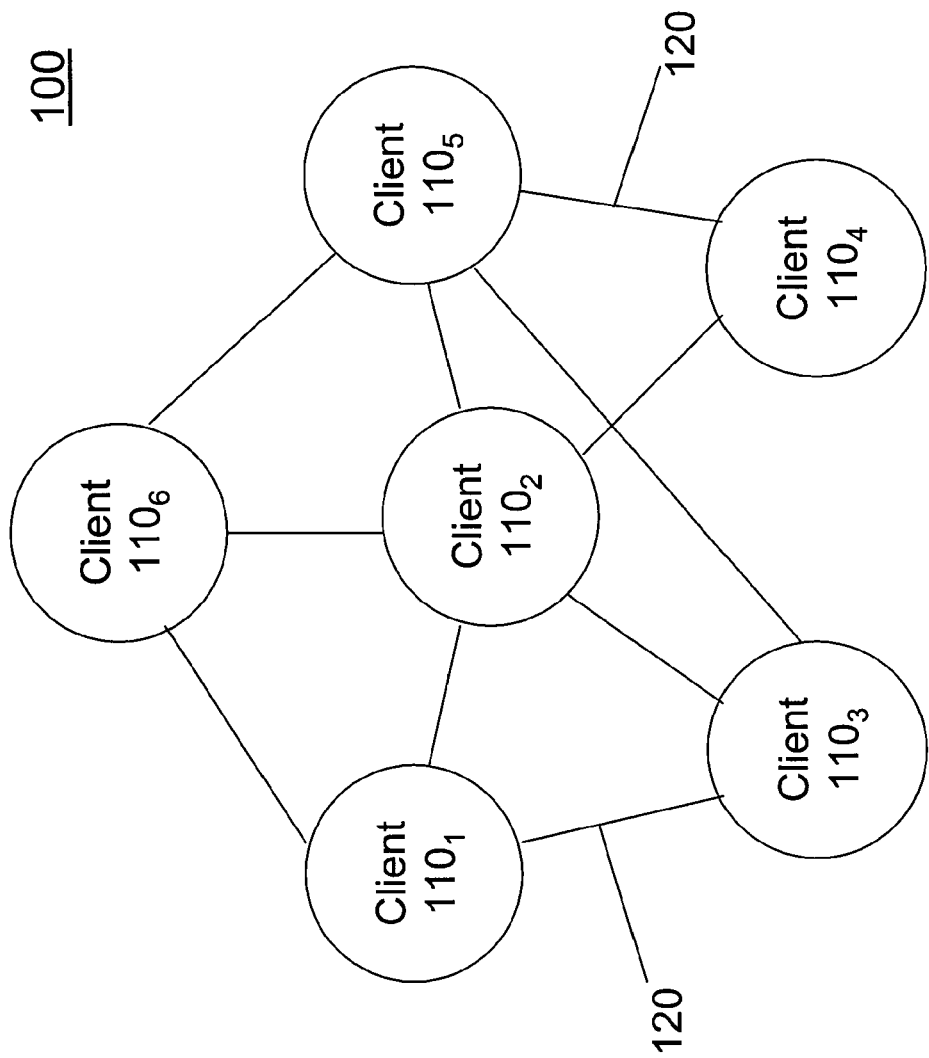
FIG. 1 is a block diagram of a conventional P2P network.

In general, one embodiment of the invention relates to a linked-list hybrid Peer-to-Peer (P2P) network architecture that optimizes throughput at a desired communication speed by grouping nodes with similar bandwidth speeds into separate networking groups. This contradicts conventional P2P architectures where nodes supporting vastly different communication speeds are placed into the same networking group, which causes less-than-optimal throughput due to increased inconsistency of the data transfer rate. By grouping nodes that are capable of supporting similar data rates and excluding nodes supporting data rates less than a threshold data rate from joining that specific networking group, the linked-list hybrid P2P network optimizes the throughput performance of the specific networking group as well as eliminates free-loader problems common in conventional P2P networks.

According to another aspect of an embodiment of the invention, the linked-list hybrid P2P network architecture guarantees to maintain the maximum throughput of the communication speed by connecting nodes along a one-to-one chain and by monitoring and removing any node having throughput that may have suddenly dropped below a minimum speed threshold. The removed node can re-join the same networking group when its throughput is determined to consistently exceed the minimum speed threshold. The one-to-one architecture reduces the complexity of monitoring the downloading and uploading speed of multiple nodes and further avoids the adverse effects to node speed caused by other nodes transitioning in or out of the networking group.

In yet another aspect of an embodiment of the invention, the linked-list hybrid P2P network architecture eliminates the delay experienced when a large number of nodes join or leave a network by allowing joining nodes to connect to servers or super nodes while attempting a connect to another node. This connection to the server(s) or super node(s) ceases after a successful connection to other nodes.

Similarly, a node that loses a connection to other nodes can immediately connect to a video server or super node while attempting a connection to another node. By using servers or super nodes (as in client-server architecture) during a connecting period (JOIN process) and P2P architecture in other period, the linked-list hybrid P2P architecture takes advantage of fast respond times to a large number of peers joining and leaving a particular channel while maintaining the low cost solution. This hybrid P2P architecture eliminates the need of complex pre-connection or alternative connection of peers since re-connection time is no longer a critical factor.

In yet another aspect of the present invention, the linked-list hybrid P2P network architecture prevents data starvation and reduces the delay described during a broken communication chain (caused by node removal or leaving the network). The reduction in delay is accomplished by obtaining data directly from one or more servers or super nodes until the nodes can establish communications over the entire sub-network.

In yet another aspect of the invention, the linked-list hybrid P2P network architecture reduces a channel-switching delay caused by switching of a television channel, by obtaining data directly from servers or super nodes until the node can establish its connection to the P2P network. Conventional P2P network architectures suffer from large channel-switching delays caused by firewall protection between nodes. Nowadays, most nodes will be behind one or more routers equipped with Network Address translation (NAT) firewall.

In the following description, certain terminology is used to describe various features of one or more embodiments of the invention. For instance, "node" is generally defined as any electronic device that is capable of receiving, processing and/or transmitting audio/video (AV) content, such as video and/or audio streams for example. Examples of a "node" include, but are not limited or restricted to any computer (e.g., laptop, tablet, handheld, desktop, server, mainframe, etc.), networking equipment (e.g., router/bridge, brouter, etc.), a cellular telephone, a video game player, and the like.

"Software" is generally defined as one or more instructions that/when executed, cause the node to perform a particular function or functions. These instructions may be stored within machine-readable medium such as firmware or software. "Machine-readable medium" is any medium that can at least temporarily store information including, but not limited or restricted to the following: an electronic circuit, a semi-conductor memory device (non-volatile or volatile), a hard disk drive, and various types of portable storage devices (e.g., flash drive, compact disc "CD", digital versatile disk "DVD", etc.).

In general, a "connection" is an established communication pathway between two electronic devices. A "network removal event" is an action that causes removal of a node from the linked-list. As an example, if the node enters into an S5 state (shut-down), this action constitutes a network removal event. Other types of network removal events include, but are not limited or restricted to the following: system crash, changing a viewing channel by the user, an inoperable transceiver or the like.

Figure 2A:
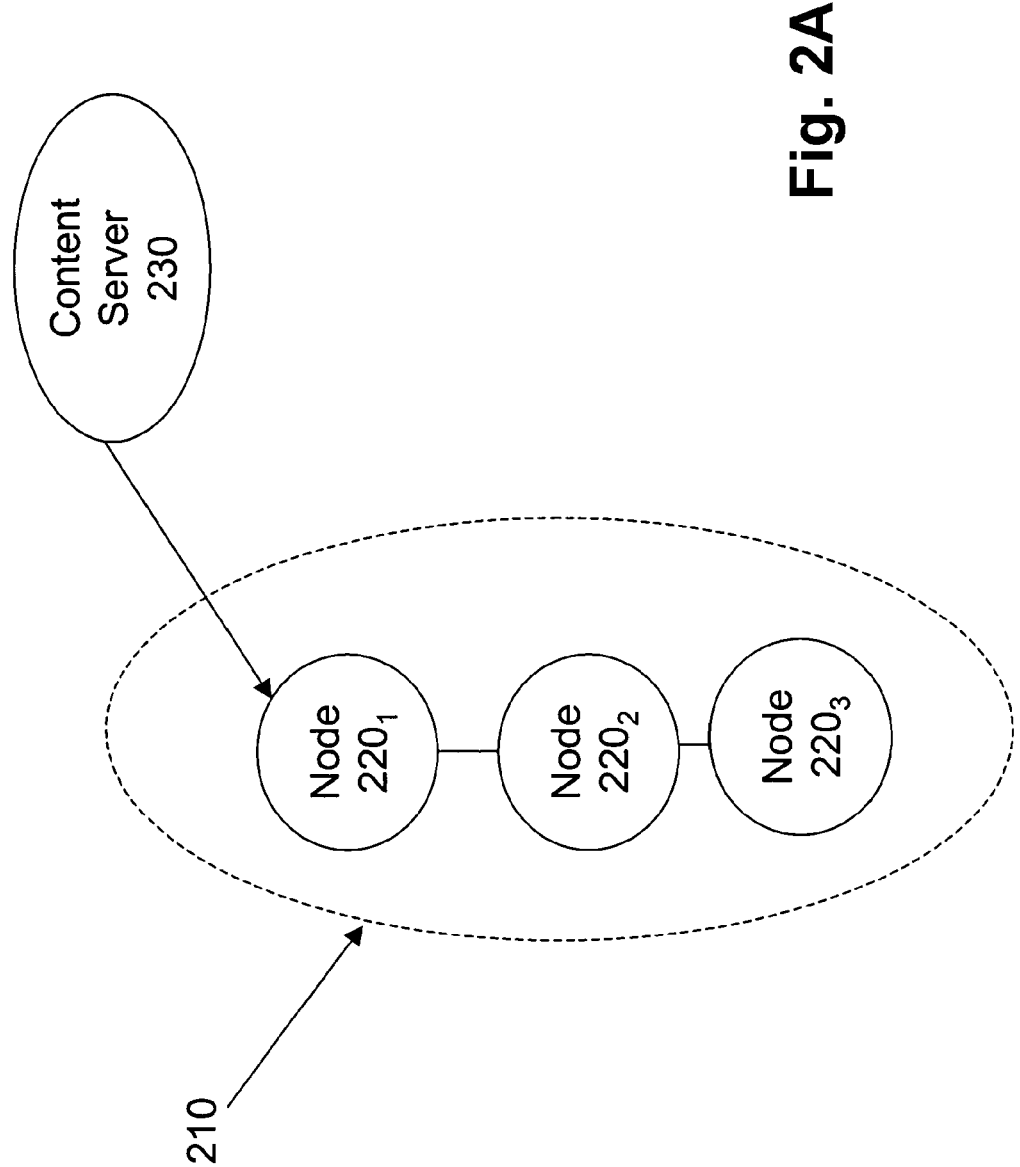
FIGS. 2A and 2B are exemplary embodiments of a linked-listed hybrid P2P network.
Figure 2B:
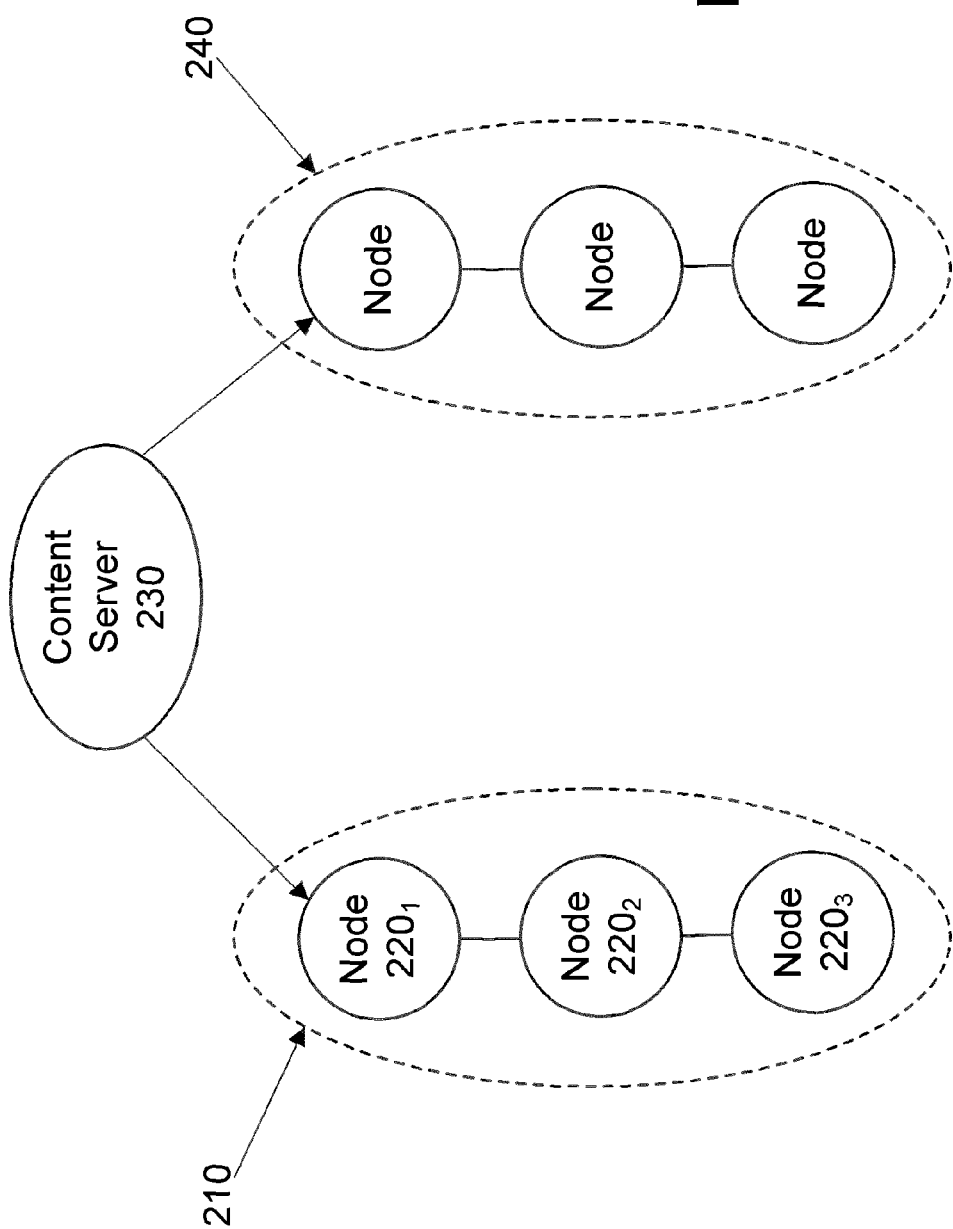

Referring to FIGS. 2A and 2B, exemplary embodiments of a hybrid P2P network 200 are shown. Network 200 comprises one or more linked-list hybrid P2P sub-networks 210 that are structured to combine nodes with similar speed capabilities and within the same general locale. For instance, as an illustrative example, nodes in close proximity to each other and supporting transmission rates exceeding 1 megabit/second (Mb/s) may be assigned to a first sub-network 210 while nodes supporting transmission rates between 1 Mb/s and 500 kilobits/sec (Kb/s) may be assigned to a different sub-network 240. Herein, first sub-network 210 includes two or more nodes $220_1$-$220_N$ (N≥2) in serial communication with each other.

As further shown, first node $220_1$ receives AV content from a content server 230. Typically, the direct connection between content server 230 and first node $220_1$ is one of a more permanent nature. First node $220_1$ receives and routes the AV content to a second node $220_2$. As an optional feature, according to this embodiment of the invention, first node $220_1$ may also display or play back the AV content. Second node $220_2$ receives the AV content from first node $220_1$, and in response, also processes the AV content for display or playback. Since there is yet another node in the linked-link P2P network architecture, second node $220_2$ receives and routes the AV content to a third node $220_3$. Here, third node $220_3$ receives and processes the AV content for display or playback, but is not yet connected to route the received AV content to yet another node along linked-list hybrid P2P sub-network 210.

Figure 3:
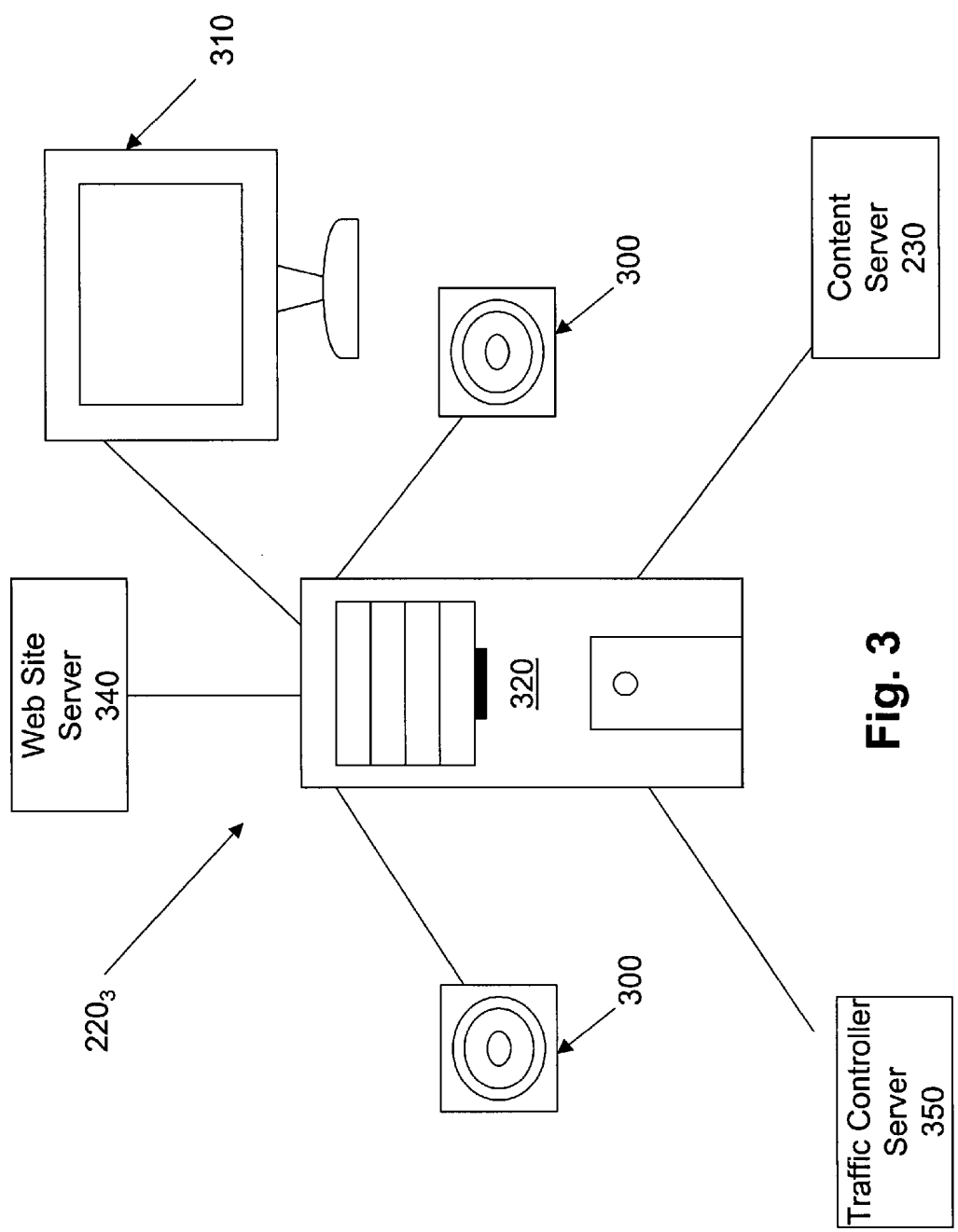
FIG. 3 is an exemplary embodiment of a node implemented within the linked-list hybrid P2P network of FIG. 2A.

Referring to FIG. 3, an exemplary embodiment of a node (e.g., third node $220_3$) is shown. Node $220_3$ is a computer including one or more output devices (e.g., speakers 300, display 310, etc.) and a main chassis 320 that houses logic configured to process and store data as well as receive and transmit data to other nodes. The transmit/receive logic of node $220_3$ includes hardware and software that operate to establish communications with a private or public network. For instance, according to one embodiment of the invention, node $220_3$ is adapted for IPTV, namely to establish an Internet connection with a traffic controller server 350 to download AV content (e.g., television programming).

More specifically, node $220_3$ establishes a connection with a web site hosted by web site server 340. The user selects a channel to download AV content, such as television programming for example. Web site server 340 redirects the user to traffic controller server 350. Since server 350 is aware that the requested AV content currently is being downloaded to other nodes forming sub-network 210, namely node $220_1$ and $220_2$, node $220_3$ is added to sub-network 210. As a result, AV content supplied by content server 230 is further routed via nodes $220_1$-$220_2$ to node $220_3$.

Software installed within node $220_3$ continues to monitor its throughput speed (input and/or output) to ensure these operations do not fall below a minimum threshold. If so, according to this embodiment of the invention, in response to network removal event, the software would initiate a message to node $220_2$ that it is disconnecting from sub-network 210 and would notify the user of the disconnection. Once the throughput speed of node $220_3$ returns to normal and is above the minimum threshold, a connection with sub-network 210 would be reestablished. Otherwise, after a prolonged period of time, node $220_3$ may be re-grouped with another linked-list P2P sub-network supporting a lesser throughput rate.

Referring now to FIGS. 4A-4F, an exemplary embodiment of the operations conducted by nodes within a particular linked-list sub-network 400 is shown. These operations involve a JOIN process in which node (P4) becomes a member of sub-network 400 and establishes communications with another node (P3) in order to receive streaming data such as IPTV programming.

Figure 4A:
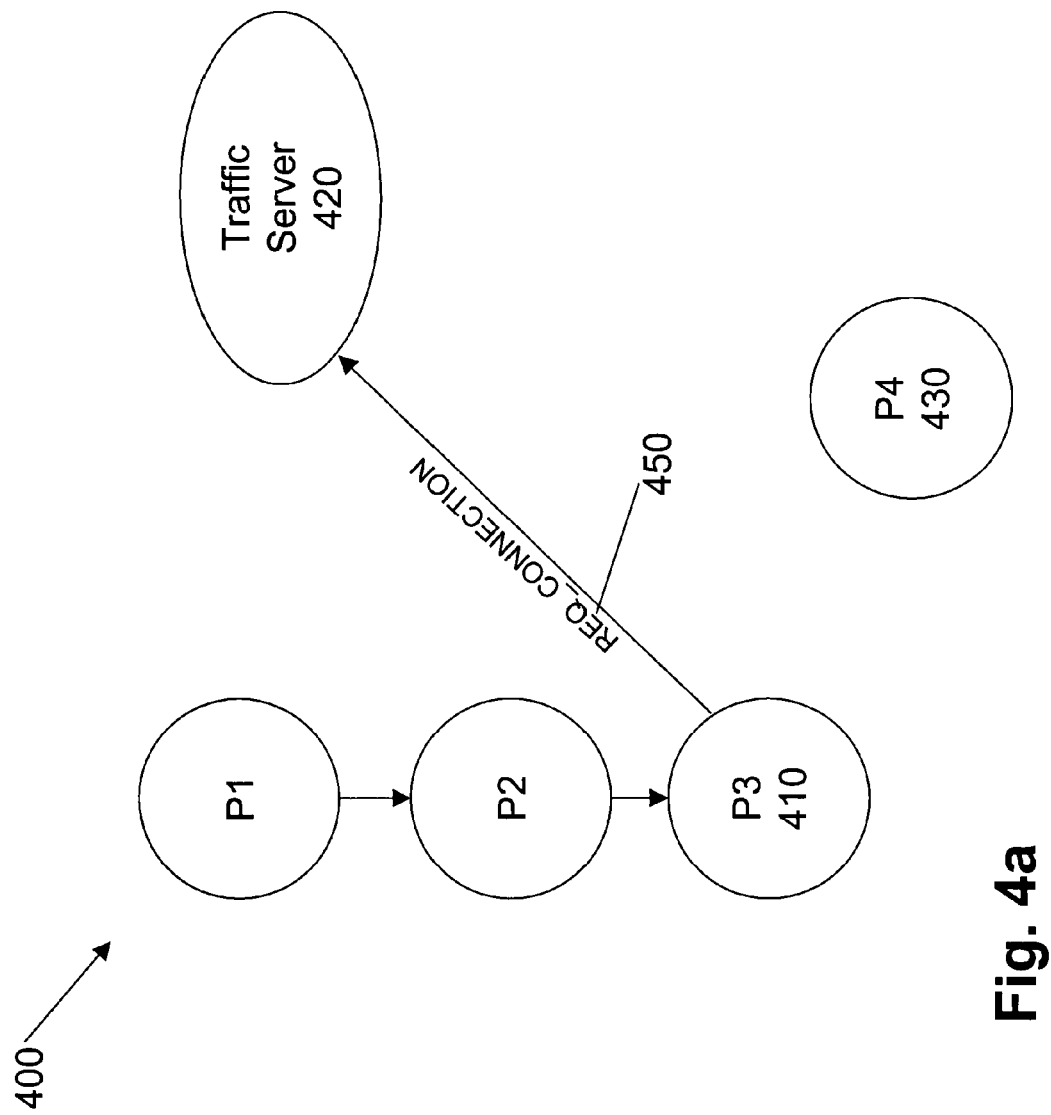
FIGS. 4A-4F are exemplary embodiments of operations performed for a node (P4) to join the linked-listed hybrid P2P network of FIG. 2A.

As illustrated in FIG. 4A, a first node (node-P3) 410 issues a REQ_CONNECTION message 450 to traffic controller server 420. Node-P3 410 transmits a $REQ_{13}$ CONNECTION message 450 after joining sub-network 400 where this transmission occurs prior to a second node (node-P4) 430 attempting to join sub-network 400. Server 420 does not send a response to REQ_CONNECTION message 450 until node-P4 430 joins sub-network 400.

Figure 4B:
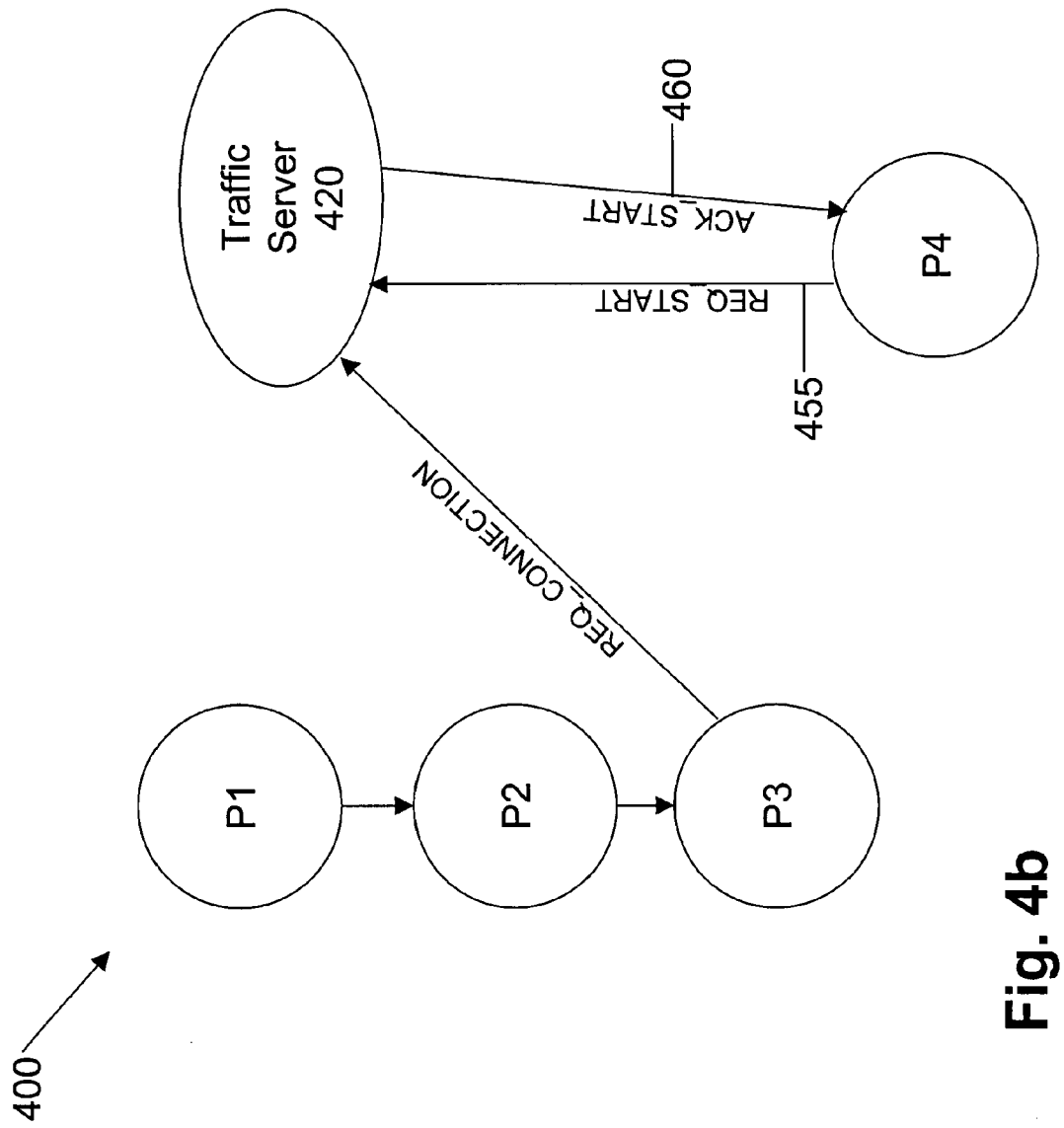

As shown in FIG. 4B, according to this embodiment of the invention, node-P4 430 sends a REQ_START message 455 to server 420 to request permission to join sub-network 400. Upon determining that node-P4 430 possesses suitable device characteristics to join sub-network 400, such as bit rate as an example, server 420 returns an ACK_START message 460. ACK_START message 460 includes a unique IP address assigned to node-P4 430.

Figure 4C:
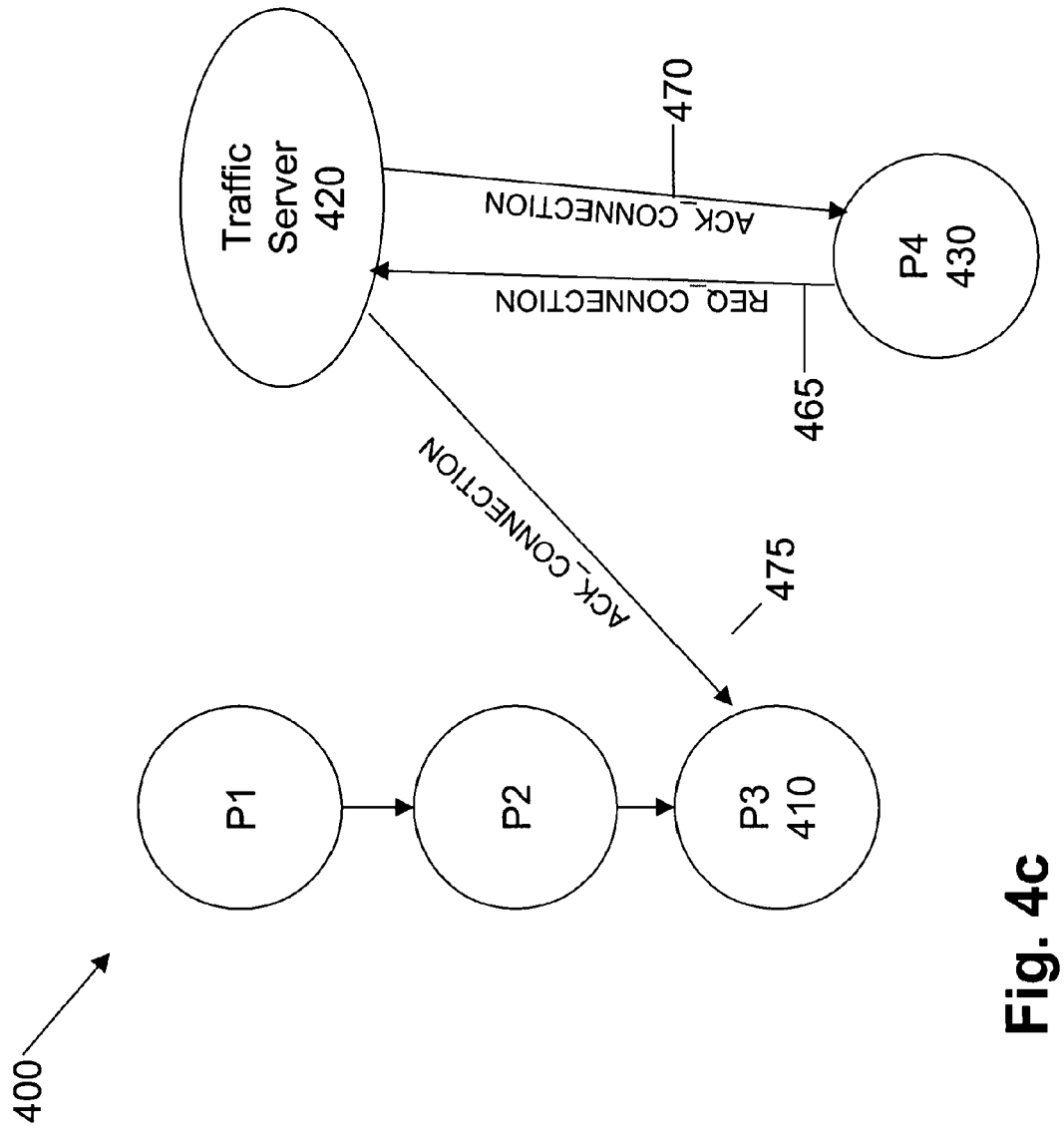

Thereafter, as shown in FIG. 4C, node-P4 430 sends a REQ_CONNECTION message 465 to server 420 in order to commence establishing a connection to sub-network 400. In response, server 420 returns an ACK_CONNECTION message 470. ACK_CONNECTION message 470 includes an IP address of node-P3 410, which is used for establishing communications between node-P4 430 and node-P3 410. Moreover, server 420 returns an ACK_CONNECTION message 475 to node-P3 410 with the IP address of node-P4 430.

Figure 4D:
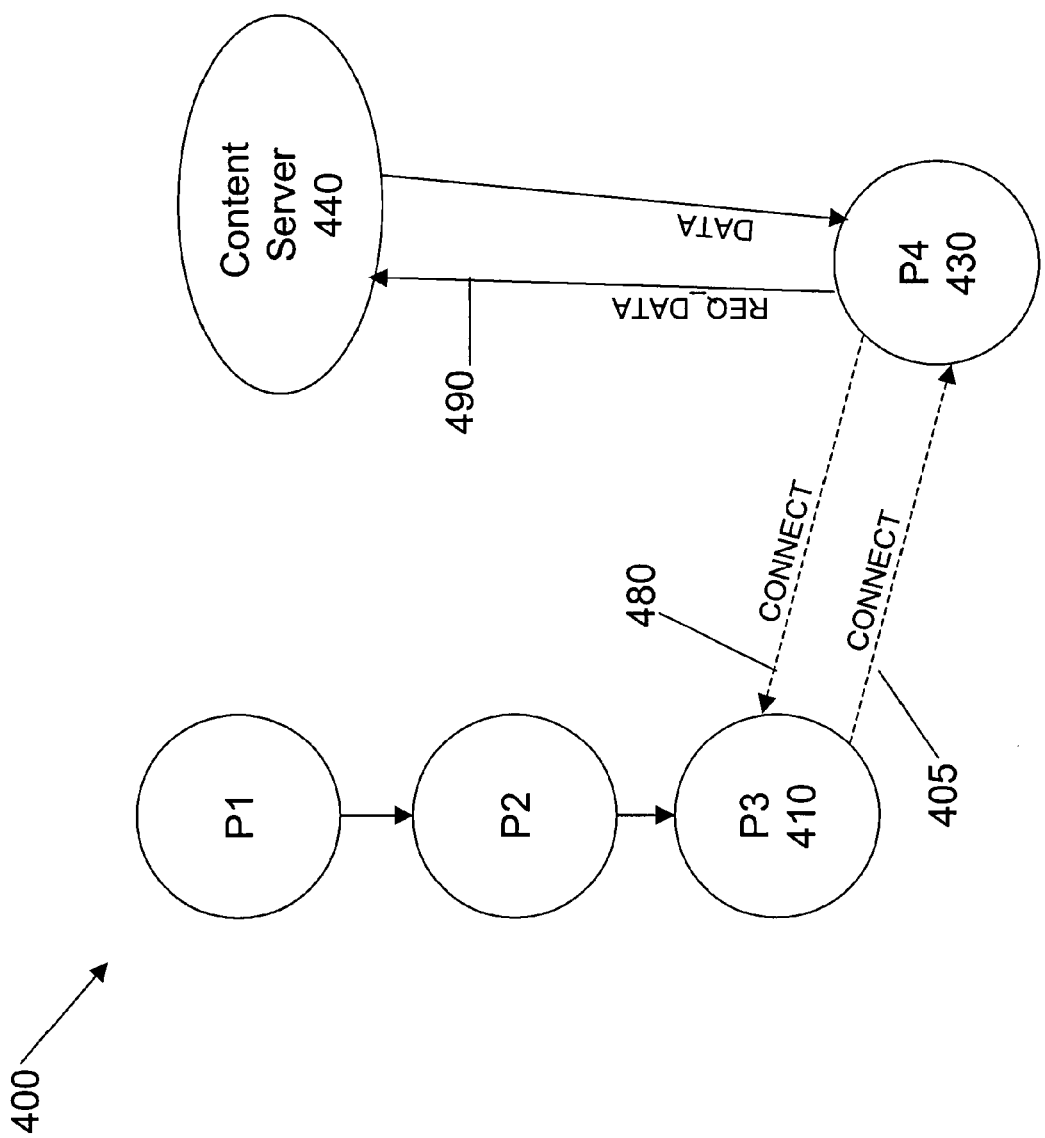

After receiving these IP addresses, node-P3 410 and node-P4 430 each issue CONNECT messages 480 and 485 in order to (i) pierce existing firewalls (represented by dashed lines) and (ii) establish communications between these nodes as shown in FIG. 4D.

Figure 4E:
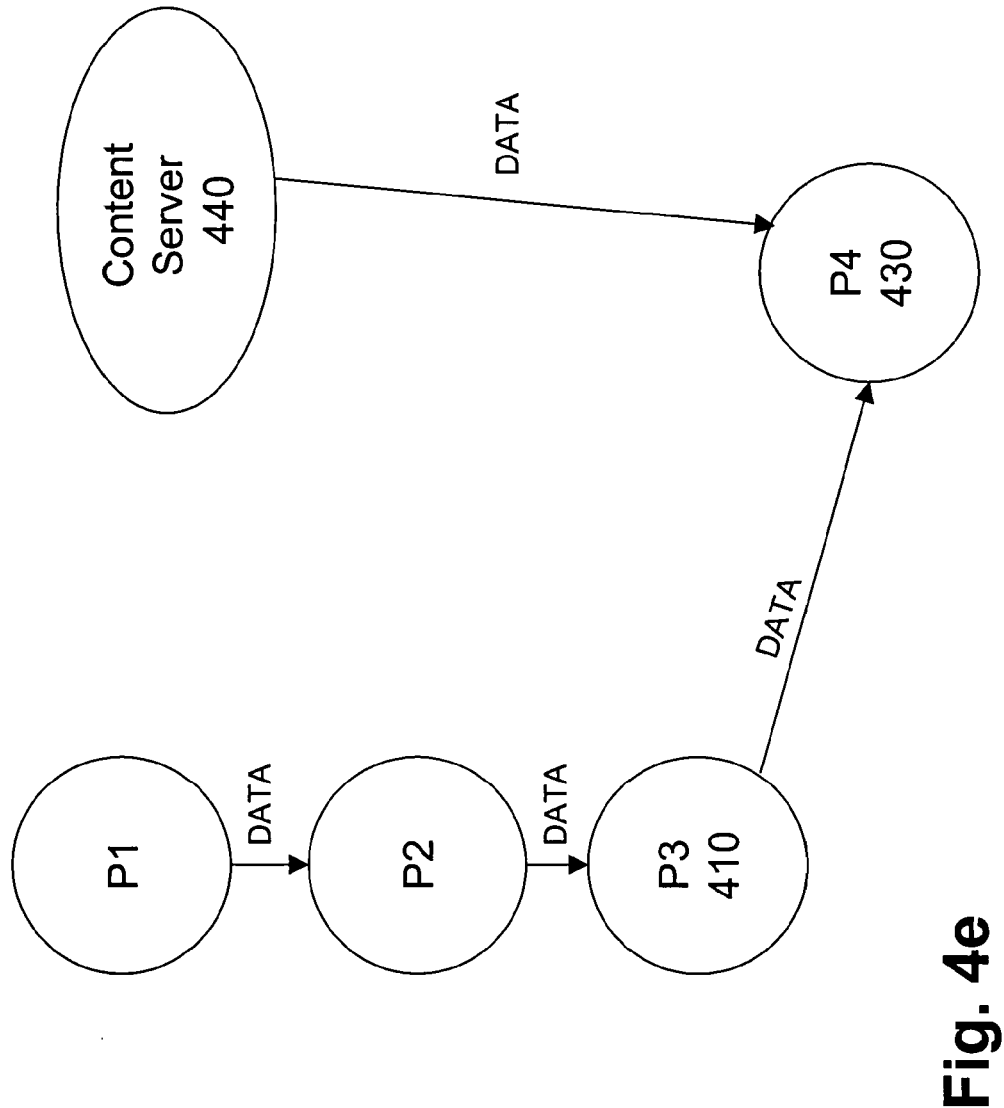
Figure 4F:
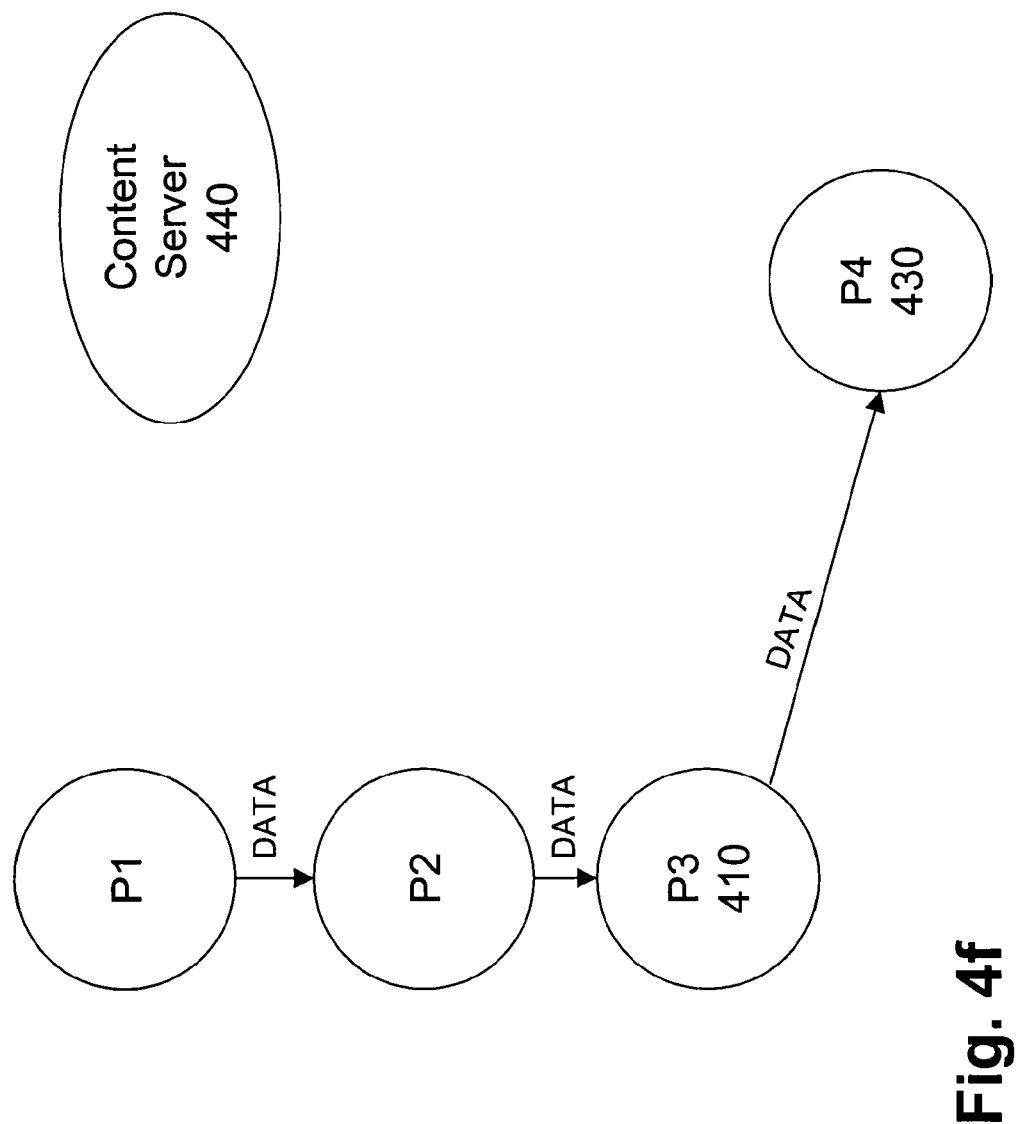

Generally concurrent with these operations, as further shown in FIG. 4D, node-P4 430 issues a REQ_DATA message 490 to a content server 440 requesting data to be downloaded while communications are being established with node-P3 410. REQ_DATA message 490 includes the IP address of node-P4 430 and a starting sequence number (SeqNum) of the data stream. SeqNum is used to identify from a particular frame of AV content from which server 440 will begin to transmit the AV content to node-P4 430. Such transmission will continue until node-P4 430 closes the connection as shown in FIG. 4E. The connection is closed upon establishing communications between node-P3 410 and node-P4 430 as shown in FIG. 4F.

Figure 5A:
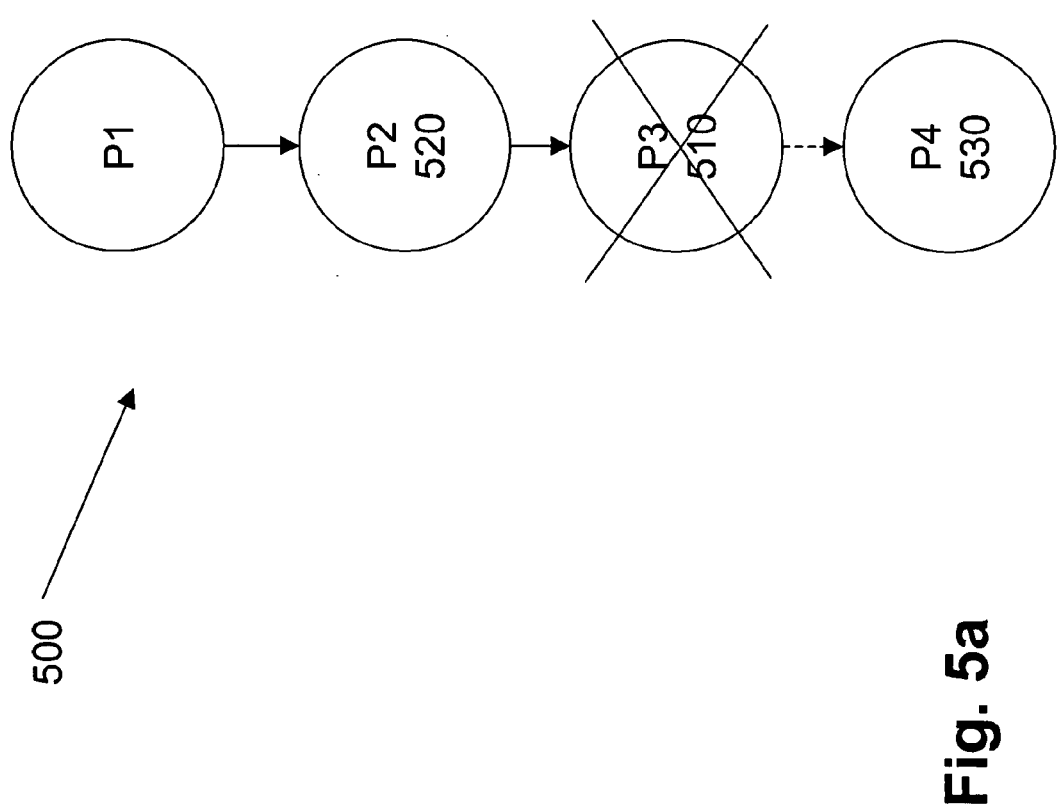

Referring now to FIGS. 5A-5D, an exemplary embodiment of the operations conducted by nodes within a particular linked-list sub-network 500 is shown. These operations involve a RE-JOIN process in which a node (P3) 510 experiences a network removal event and disconnects from sub-network 500 as shown in FIG. 5A. Neighboring nodes (P2, P4) 520 and 530 detect that node-P3 520 has disconnected from sub-network 500 and initiate a RE-JOIN process.

Figure 5B:
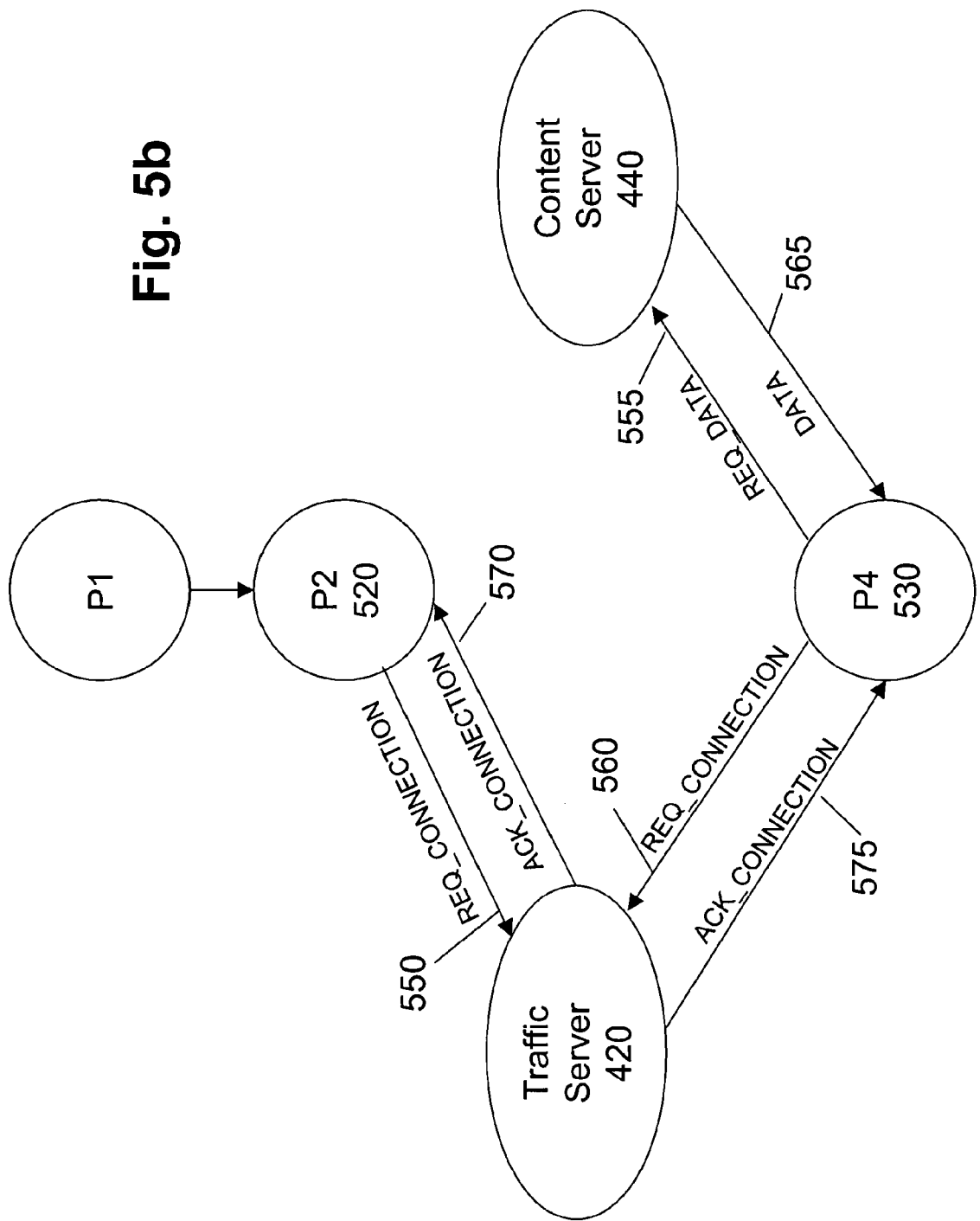

As illustrated in FIG. 5B, node-P2 520 transmits a REQ_CONNECTION message 550 to traffic server 420 upon detecting that node-P3 510 has disconnected from sub-network. Concurrently, node-P4 530 transmits a REQ_DATA message 555 to content server 440 requesting data to be downloaded while communications are being re-established with sub-network 500. REQ_DATA message 555 includes the IP address of node-P4 530 and a starting sequence number (SeqNum) of the data stream. Also, node-P4 530 transmits a REQ_CONNECTION message 560 to traffic server 420 to reestablish connections with sub-network 500.

Upon receiving REQ_DATA message 555 from node-P4 530, content server 440 begins transmission of the data stream 565 starting at a frame references by SeqNum. Moreover, traffic server 420 returns ACK_CONNECTION messages 570 and 575 to node-P2 520 and node-P4 530, where messages 570 and 575 include IP addresses of their neighboring nodes for re-establishing communications.

Figure 5C:
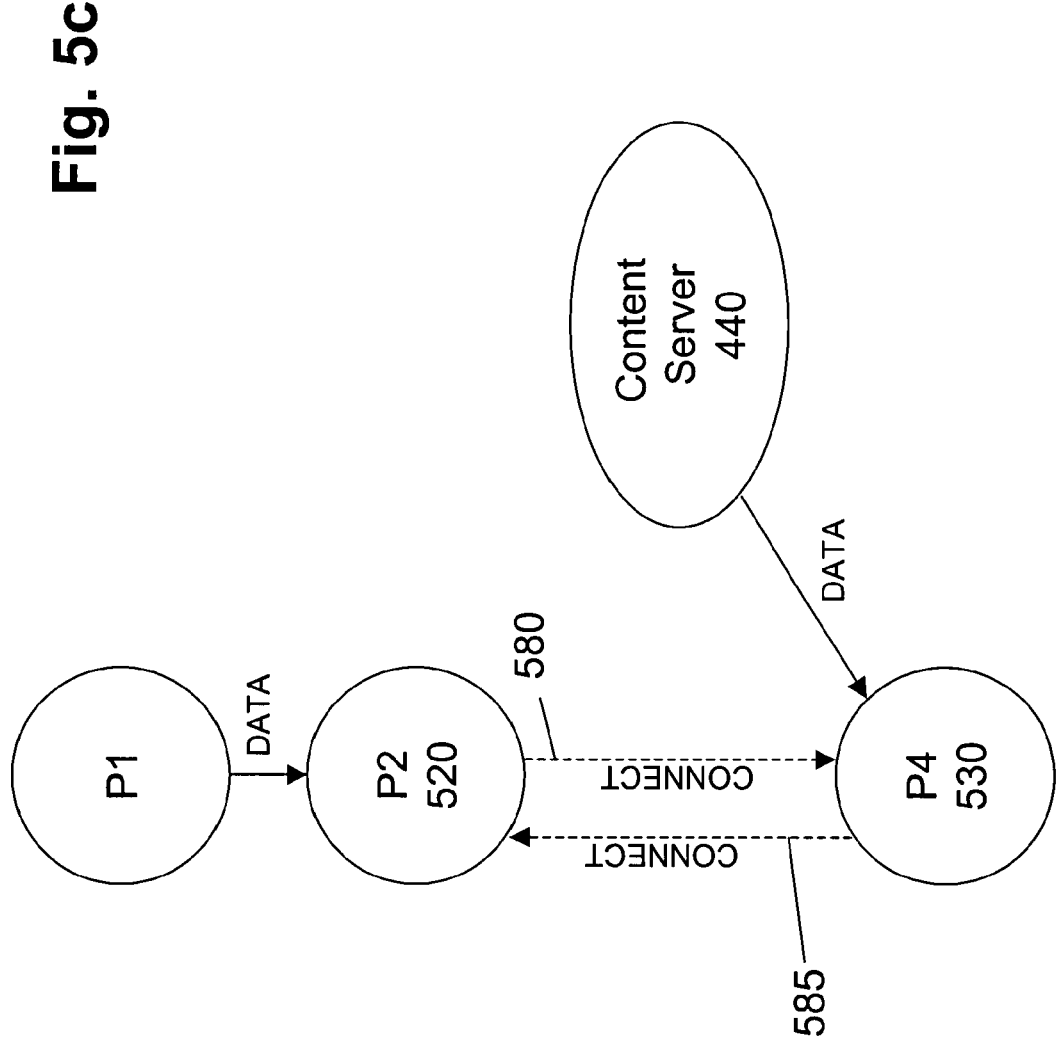

Referring now to FIG. 5C, after receiving ACK_CONNECTION message 570, node-P2 520 issues a CONNECT messages 580 addressed by the IP address of node-P4 530 in order to establish communications with node-P4 530. Similarly, node-P4 530 issues a CONNECT messages 585 addressed by the IP address of node-P2 520 in order to establish communications with node-P2 520. Once communications are established, node-P4 530 begins to receive AV content from node-P2 520 and terminates receipt of the AV content from content server 440 as shown in FIG. 5D.

Although the present invention has been described with respect to specific examples and subsystems, it will be apparent to those of ordinary skill in the art that the invention is not limited to these specific examples or subsystems but extends to other embodiments as well.

What is claimed is:

1. A system for transferring streaming audio or video content over a linked-list hybrid peer-to-peer sub-network of nodes arranged in one-to-one chains to allow for dissemination of audio or video content to multiple peers, the system comprising:

a traffic server adapted to direct an arrangement of a plurality of nodes by communicating instructions to the plurality of nodes, the instructions configured to direct the plurality of nodes to communicate with one another to form two or more one-to-one chains comprising at least a first one-to-one chain and a second one-to-one chain, wherein a first node in the first one-to-one chain receives the audio or video content from a content server and all other nodes in the first one-to-one chain receive the audio or video content from at most one other node of the plurality of nodes and each node in the first one-to one chain transmits the audio or video content to at most one other node of the plurality of nodes, wherein a first node in the second one-to-one chain receives the audio or video content from the content server and all other nodes in the second one-to-one chain receive the audio or video content from at most one other node of the plurality of nodes and each node in the second one-to one chain transmits the audio or video content to at most one other node of the plurality of nodes, wherein nodes leaving or joining the first one-to-one chain or the second one-to-one chain receive the audio or video content from the content server without the audio or video content passing through another node of the plurality of nodes, and wherein the plurality of nodes are grouped into the one-to-one chains according to their respective bandwidth, such that all the nodes in the first one-to-one chain have a higher bandwidth than all the nodes in the second one-to-one chain.

2. The system of claim 1, wherein, upon determining that at least one node of the plurality of nodes that precedes a second node of the plurality of nodes has failed, the traffic server is adapted to communicate an instruction to the second node of directing the second node to communicate to receive the audio or video content from the content server without the audio or video content passing through another node of the plurality of nodes.

3. The system of claim 2, wherein the traffic server is adapted to communicate an instruction to the second node directing the second node to establish inbound communications with a third node.

4. The system of claim 1, wherein the traffic server is adapted to communicate an instruction to a requesting node directing the requesting node to establish inbound communications with an existing node if the requesting node has a bandwidth that exceeds a threshold.

5. A method for transferring streaming audio or video content over a linked-list hybrid peer-to-peer sub-network of nodes arranged in one-to-one chains to allow for dissemination of the audio or video content to multiple peers, the system comprising:

communicating instructions to a plurality of nodes, the instructions configured to direct the plurality of nodes to communicate with one another to form two or more one-to-one chains comprising at least a first one-to-one chain and a second one-to-one chain, communicating to a first node in the first one-to-one chain audio or video content, wherein all other nodes in the first one-to-one chain receive the audio or video content from at most one other node of the plurality of nodes and each node in the first one-to one chain transmits the audio or video content to at most one other node of the plurality of nodes;

communicating to a first node in the second one-to-one chain the audio or video content, wherein all other nodes in the second one-to-one chain receive the audio or video content from at most one other node of the plurality of nodes and each node in the second one-to one chain transmits the audio or video content to at most one other node of the plurality of nodes, wherein nodes leaving or joining the first one-to-one chain or the second one-to-one chain receive the audio or video content from a content server without the audio or video content passing through another node of the plurality of nodes, and wherein the plurality of nodes are grouped into the one-to-one chains according to their respective bandwidth, such that all the nodes in the first one-to-one chain have a higher bandwidth than all the nodes in the second one-to-one chain.

6. The method of claim 5, further comprising:

determining that at least one node of the plurality of nodes that precedes a second node of the plurality of nodes has failed, and upon determining that the at least one node has failed, directing the second node to communicate with the content server to receive the audio or video content from the content server without the audio or video content passing through another node of the plurality of nodes.

7. The method of claim 6, further comprising directing the second node to establish inbound communications with a third node.

8. The method of claim 5, further comprising communicating an instruction to a requesting node directing the requesting node to establish inbound communications with an existing node if the requesting node has a bandwidth that exceeds a threshold.

* * * * *